(12) United States Patent
Shang et al.

(10) Patent No.: US 12,301,985 B2
(45) Date of Patent: May 13, 2025

(54) PHOTOGRAPHING METHOD AND APPARATUS, AND DEVICE, STORAGE MEDIUM AND PROGRAM PRODUCT

(71) Applicant: Beijing Zitiao Network Technology Co., Ltd., Beijing (CN)

(72) Inventors: Fengyi Shang, Beijing (CN); Yinghui Wang, Beijing (CN); Shaopan Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/756,310

(22) Filed: Jun. 27, 2024

(65) Prior Publication Data
US 2024/0348917 A1     Oct. 17, 2024

Related U.S. Application Data

(63) Continuation of application No. PCT/CN2023/086106, filed on Apr. 4, 2023.

(30) Foreign Application Priority Data

Apr. 14, 2022   (CN) .......................... 202210394621.7

(51) Int. Cl.
*H04N 23/60*   (2023.01)
*H04N 23/63*   (2023.01)

(52) U.S. Cl.
CPC .......... *H04N 23/64* (2023.01); *H04N 23/632* (2023.01)

(58) Field of Classification Search
CPC ................ H04N 23/632; H04N 23/64; H04N 5/232945; H04N 5/23245; H04N 5/23216; H04N 5/23222

See application file for complete search history.

(56) References Cited

U.S. PATENT DOCUMENTS

| 7,349,020 B2 | 3/2008 | Stavely et al. |
| 8,582,891 B2 | 11/2013 | Yim et al. |

(Continued)

FOREIGN PATENT DOCUMENTS

| CN | 105872382 A | 8/2016 |
| CN | 108184050 A | 6/2018 |

(Continued)

OTHER PUBLICATIONS

ISA China National Intellectual Property Administration, International Search Report Issued in Application No. PCT/CN2023/086106, Jun. 22, 2023, 5 pages.

(Continued)

*Primary Examiner* — Xi Wang
(74) *Attorney, Agent, or Firm* — Alleman Hall & Tuttle LLP

(57) ABSTRACT

The present disclosure relates to a photographing method and apparatus, and a device, a storage medium and a program product. The method includes: in response to the selection of a scene type, displaying one or more image processing templates corresponding to the selected scene type; in response to a selection operation for the image processing templates, determining image processing information corresponding to a selected image processing template; displaying one or more material information items corresponding to the image processing template; and in response to a received photographing instruction, performing photographing on the basis of the image processing information.

13 Claims, 9 Drawing Sheets

(56) References Cited

U.S. PATENT DOCUMENTS

| | | |
|---|---|---|
| 10,425,578 B1 | 9/2019 | Westheimer et al. |
| 2017/0287147 A1* | 10/2017 | Takahashi ................. G06T 7/35 |
| 2023/0018557 A1* | 1/2023 | Jiang ..................... H04N 23/64 |
| 2024/0089585 A1 | 3/2024 | Zhang et al. |

FOREIGN PATENT DOCUMENTS

| | | |
|---|---|---|
| CN | 108346171 A | 7/2018 |
| CN | 110177219 A | 8/2019 |
| CN | 113364971 A | 9/2021 |
| CN | 113473019 A | 10/2021 |
| EP | 3654625 A1 | 5/2020 |
| JP | 2004015735 A | 1/2004 |
| JP | 2005025027 A | 1/2005 |
| JP | 2008124877 A | 5/2008 |
| JP | 2011061452 A | 3/2011 |
| JP | 2013228790 A | 11/2013 |
| JP | 2017090819 A | 5/2017 |
| JP | 2022049308 A | 3/2022 |
| KR | 20090122572 A | 12/2009 |
| KR | 20190073802 A | 6/2019 |

OTHER PUBLICATIONS

Japan Patent Office, Notice of Refusal for Japanese Application No. 2024-539246, mailed Dec. 10, 2024, 12 pages.
European Patent Office, Extended European Search Issued in Application No. 23787553.9, Feb. 25, 2025, 8 pages.

* cited by examiner

PHOTOGRAPHING METHOD AND APPARATUS, AND DEVICE, STORAGE MEDIUM AND PROGRAM PRODUCT

CROSS-REFERENCE TO RELATED APPLICATIONS

This application is a continuation application of International Patent Application No. PCT/CN2023/086106, filed on Apr. 4, 2023, which claims the benefit of Chinese Patent Application for invention No. 202210394621.7, filed on Apr. 14, 2022, the disclosure of each of which are hereby incorporated into this disclosure by reference in their entireties.

TECHNICAL FIELD

The present disclosure relates to a photographing method and apparatus, a device, a storage medium and a program product.

BACKGROUND

With the rapid development of various Internet technologies, a smart terminal has become an indispensable tool in our daily life. With the continuous improvement of the functions of the smart terminal and the increasing number of pixels in a camera of the smart terminal, most users prefer to take photos with the smart terminal.

With continuous improvement and optimization of a photographing function of a mobile terminal, the user when taking photos may adjust photographing parameters and use various materials preset in the terminal, for example, makeup, filters, stickers, beauty, or the like.

SUMMARY

In a first aspect, the embodiment of the present disclosure provides a photographing method. The method comprises: displaying one or more image processing templates corresponding to a scene type selected in response to selection of the scene type; determining image processing information corresponding to an image processing template selected in response to a selection operation on the one or more image processing templates; displaying one or more material information items corresponding to the image processing template; and performing photographing based on the image processing to information in response a received photographing instruction.

In a second aspect, the embodiment of the present disclosure provides a photographing apparatus. The apparatus comprises: an image processing template displaying module configured to display one or more image processing templates corresponding to a scene type selected in response to selection of the scene type; an image processing information determination module configured to determine image processing information corresponding to an image processing template selected in response to a selection operation on the one or more image processing templates; a material information displaying module configured to display one or more material information items corresponding to the image processing template; and a photographing module configured to perform photographing based on the image processing information in response to a received photographing instruction.

In a third aspect, the embodiment of the present disclosure provides an electronic device. The electronic device comprises: one or more processors; and a storage means configured to store one or more programs; wherein the one or more programs, when executed by the one or more processors, cause the one or more processors to implement the photographing method according to any of the above-described first aspect.

In a fourth aspect, the embodiment of the present disclosure provides a computer-readable storage medium having a computer program stored thereon that, when executed by a processor, implements the photographing method according to any of the above-described first aspect.

In a fifth aspect, the embodiment of the present disclosure provides a computer program product, comprising computer programs or instructions that, when executed by a processor, implement the photographing method according to any of the above-described first aspect.

In a sixth aspect, the embodiment of the present disclosure provides a computer program, comprising: instructions that, when executed by a processor, cause the processor to perform the photographing method according to any of the above-described first aspect.

BRIEF DESCRIPTION OF THE ACCOMPANYING DRAWINGS

The above-described and other features, advantages and aspects of embodiments of the present disclosure will become more apparent in conjunction with the accompanying drawings and with reference to the following detailed description. Throughout the accompanying drawings, the same or similar reference numerals indicate the same or similar elements. It should be understood that the accompanying drawings are schematic, and the members and elements are not necessarily drawn to scale.

DETAILED DESCRIPTION

The embodiments of the present disclosure will be described in more detail with reference to the accompanying drawings below. Although the accompanying drawings illustrate some embodiments of the present disclosure, it should be understood that the present disclosure may be implemented in various forms, and should not be construed as being limited to the embodiments set forth herein. Rather, these embodiments are provided for a more thorough and complete understanding of the present disclosure. It should be understood that the accompanying drawings and embodiments of the present disclosure are only for illustrative purposes, rather than for limiting the protection scope of the present disclosure.

It should be understood that the various steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

It should be noted that the concepts such as "first" and "second" mentioned in the present disclosure are only used to distinguish different devices, modules or units, but not to limit the order or interdependence of functions performed by these devices, modules or units.

It should be noted that the modifications of "one" and "a plurality of" mentioned in the present disclosure are illustrative rather than restrictive, and those skilled in the art should understand that they should be understood as "one or more" unless contextually specified otherwise.

The names of messages or information exchanged between multiple devices in the embodiments of the present disclosure are only used for illustrative purposes, but not for limiting the scope of these messages or information.

The inventors of the present disclosure have found that in the related art, when the user performing photographing by using different photographing parameters and a plurality of materials, it is necessary to perform different settings and selections on various photographing parameters and the plurality of materials respectively, which leads to a complicated photographing process.

In view of this, the embodiment of the present disclosure provides a photographing method to optimize the photographing process.

The photographing method provided by the embodiment of the application will be introduced below in detail in present conjunction with the accompanying drawings.

Figure 1:
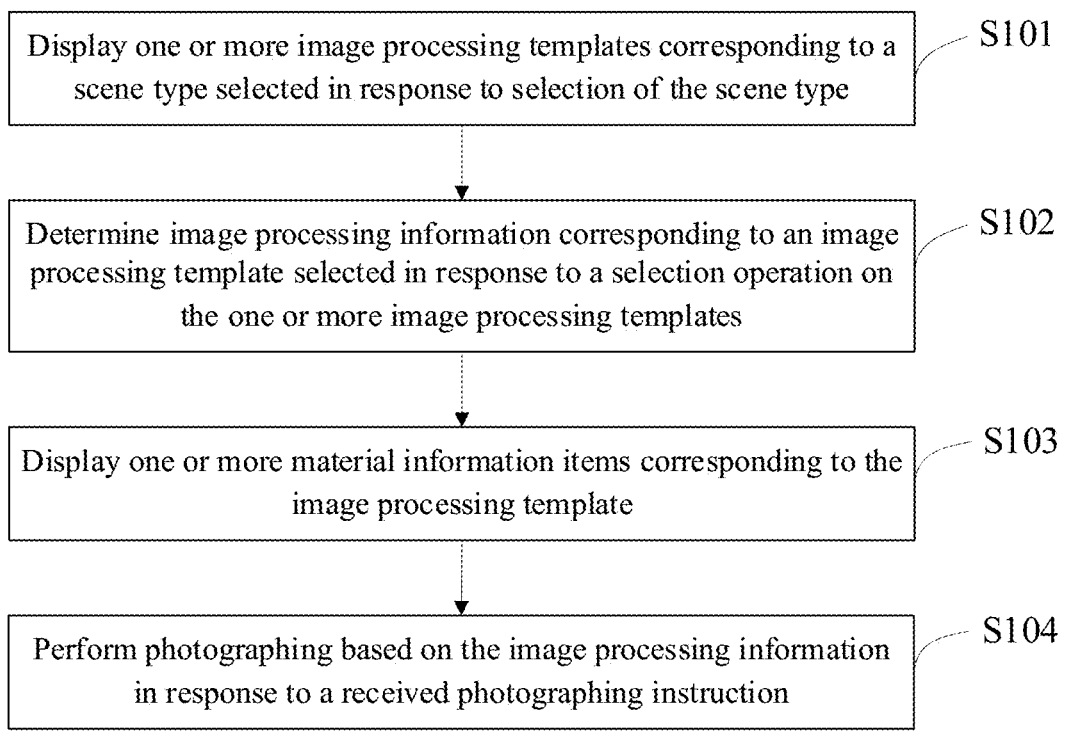
FIG. 1 is a flowchart of a photographing method in an embodiment of the present disclosure.

FIG. 1 is a flowchart of a photographing method in an embodiment of the present disclosure. The embodiment may be applied to the circumstance of photographing. The method may be performed by a photographing apparatus. The photographing apparatus may be implemented by software and/or hardware. The photographing apparatus may be configured in an electronic device. The electronic device comprises a smart terminal with a photographing function, comprising a smart phone, a notebook computer, a tablet computer, a digital camera/camcorder, a game device or the like. In some embodiments, the smart terminal comprises an integrated touch screen. The photographing method which is not limited to photo shooting, is also suitable for video shooting.

As shown in FIG. 1, the photographing method provided by the embodiment of the present disclosure mainly comprises the following steps S101 to S104.

In step S101, one or more image processing templates corresponding to a scene type selected are displayed in response to selection of the scene type.

For example, the above-described scene type may be selfie, couples, homebody, visit store checkpoint, holiday travel or the like, which are not limited in the embodiment.

Figure 2:
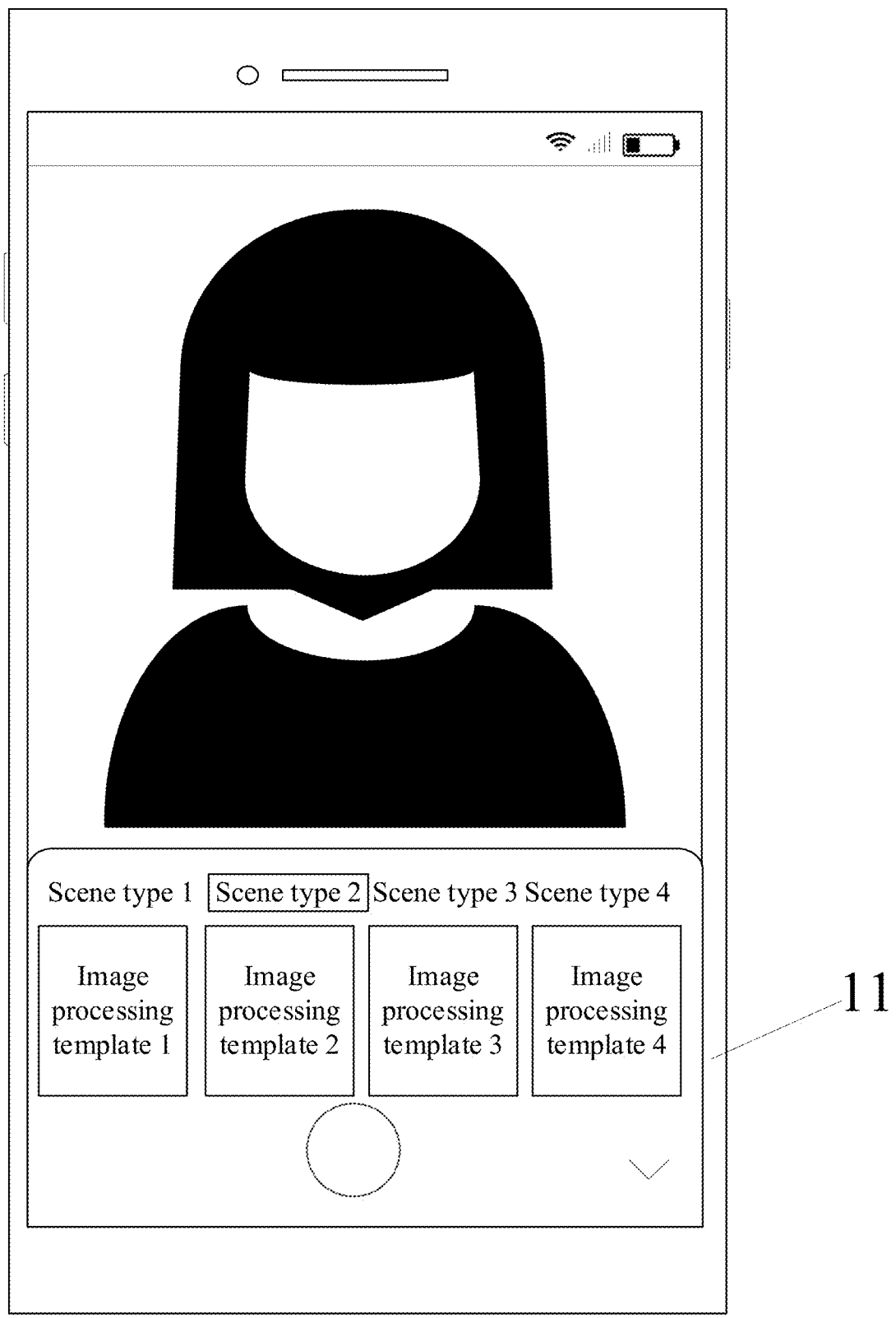
FIG. 2 is a schematic view displaying an image processing template in an embodiment of the present disclosure.

In an embodiment of the present disclosure, the displaying of the one or more image processing templates corresponding to the scene type selected comprises: displaying the one or more image processing templates corresponding to the scene type selected in a function selection area. The function selection area may be understood as an area where a selection panel such as a scene type and an image processing template is located in a photographing interface. As shown in FIG. 2, four scene types comprising a scene type 1, a scene type 2, a scene type 3 and a scene type 4, are displayed in the function selection area.

It is to be noted that, FIG. 2 only displays four scene types, but the number of the scene type is not limited in the embodiment. Further, in response to a sliding operation on the scene type, the scene type may slide to the left or right to display more scene types.

In an embodiment of the present disclosure, the image processing template may be understood as a template for processing effects such as beautification, adding virtual stickers, adding effects, flash states, photo proportions, shooting delays, exposure values or the like when performing photographing. One scene type may correspond to one or more image processing templates. For example, the corresponding image processing template in a selfie scene may be adding makeup, beautifying skin, slimming or the like. The corresponding image processing template in a holiday travel scene may be adding stickers, adjusting exposure value, using filters or the like. Different scene types may correspond to a same image processing template or different processing templates, which is not limited in the embodiment. In some embodiments, the image processing template is displayed in the form of a cover image.

In an embodiment of the present disclosure, the selection operation on the scene type may be a triggering operation on a scene type button, wherein the above-described triggering operation may be any of single clicking, double clicking and touching. For example, as shown in FIG. 2, operation is performed in response to a clicking operation on scene type 2.

In an embodiment of the present disclosure, one or more image processing templates are displayed below a scene type button in a function selection area in response to a selection operation on a scene type. As shown in FIG. 2, the embodiment displays four image processing templates comprising an image processing template 1, an image processing template 2, an image processing template 3 and an image processing template 4.

In an embodiment of the present disclosure, one or more scene types are displayed in a function selection area in response to a triggering operation on a function button (for example, a first function button) in the function selection area.

The first function may be understood as a function that there is an association relationship between an image processing information item and a material information item which are comprised in the image processing template. That is, in a first functional state, there is an association relationship between the image processing information and the material information item which are comprised in the image processing template. After an image processing template is selected, the image processing information item and the material information item which are comprised in the image processing template may also be used to take photos.

Figure 3:
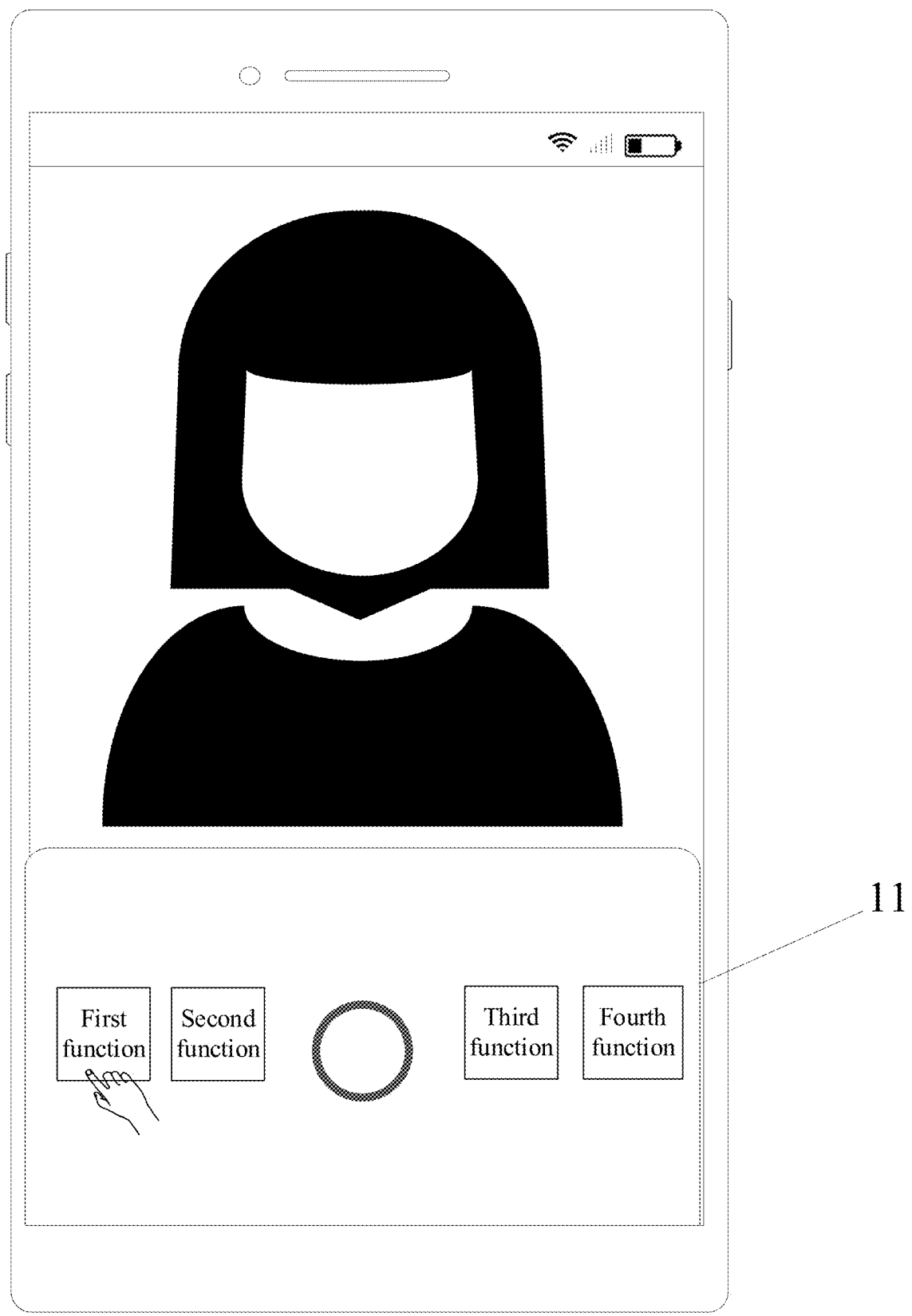
FIG. 3 is a schematic view of a function selection interface in an embodiment of the present disclosure.

As shown in FIG. 3, in response to an startup operation on a photographing application, a plurality of function buttons are displayed in the function selection area. In response to a clicking operation on a first function button, a scene selection panel is pulled up in the function selection area, wherein the scene selection panel displays one or more scene types in the function selection area. That is, in response to the clicking operation on the first function button, the function selection area 11 displays a plurality of scene types as shown in FIG. 2.

In the embodiment, a method of entering a scene type selection interface by a clicking operation on the function button is provided, which improves the user experience.

In an embodiment of the present disclosure, the method further comprises: displaying a function guidance information in a function guidance area, wherein the function guidance information comprises a function title, a function content item and a function jump button; and displaying one or more scene types in the function selection area in response to a triggering operation on the function jump button.

In an embodiment of the present disclosure, in response to the user updating the photographing app (application) without using the first function, the function guidance information is displayed in the function guidance area. When the user is not for the first use, in response to an startup operation on the photographing application, as shown in FIG. 3, a plurality of function buttons are displayed in the function selection area.

In an embodiment of the present disclosure, the function guidance information is mainly configured to display a related content item of the photographing function to the user, and to provide a method of photographing by rapidly using the image processing template. The function title refers to a name of the function, and the function content item mainly comprises a method of use of a photographing function, an effect achieved and the like. The function jump button is mainly used for the user to directly turn on the photographing function.

Figure 4:
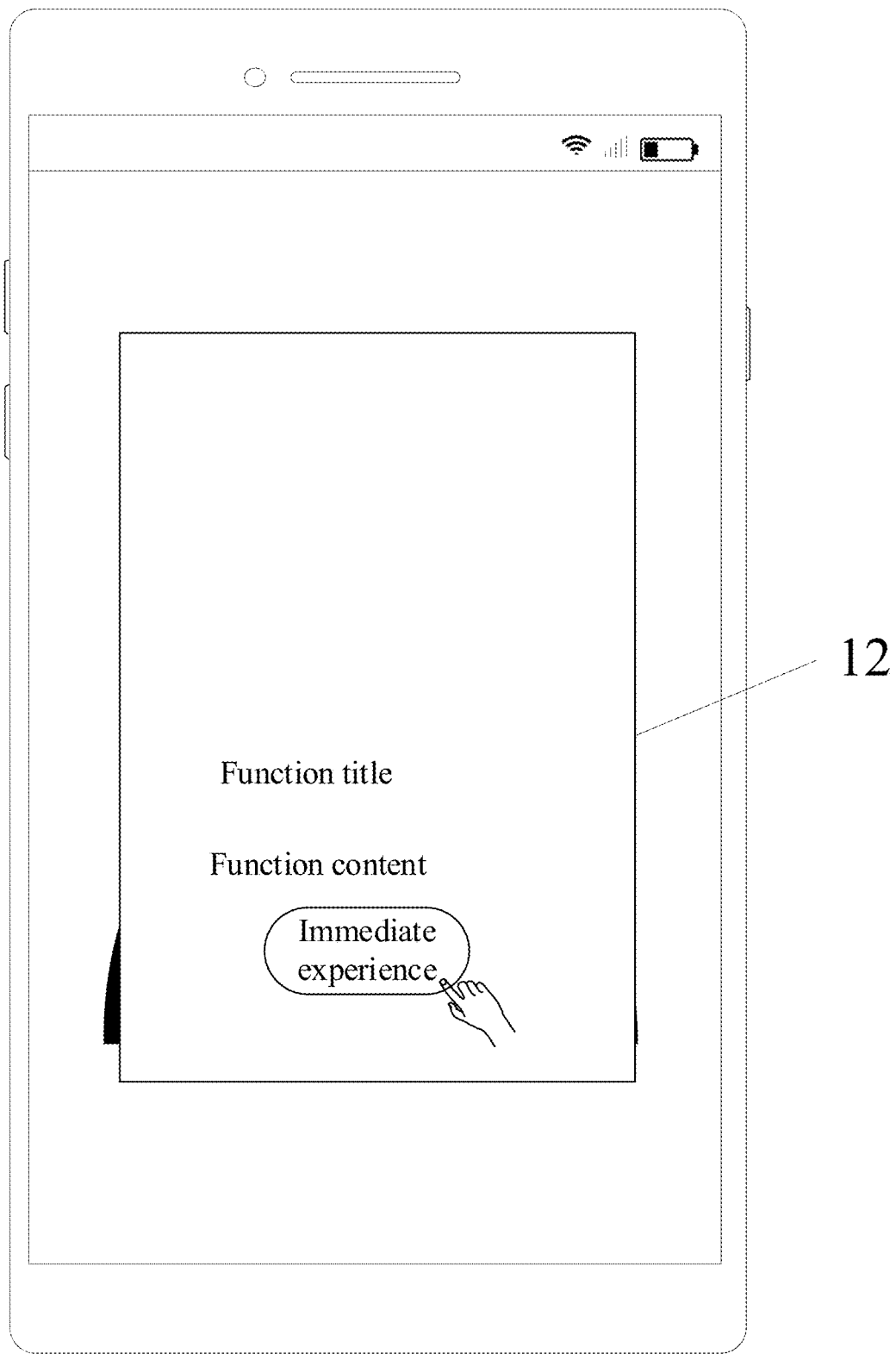
FIG. 4 is a schematic interface view of displaying the guidance information in an embodiment of the present disclosure.

As shown in FIG. 4, in response to a clicking operation on the function jump button (try now), the scene selection panel is pulled up in the function selection area, that is, one or more scene types are displayed in the function selection area. That is, in response to the clicking operation on the function jump button, the function selection area displays a plurality of scene types as shown in FIG. 2.

In the embodiment, when the user uses the first function for the first time, the guidance information is provided, which is convenient for the user to rapidly master the skills of photographing by using the first function and improves the user experience.

In step S102, image processing information corresponding to an image processing template selected is determined in response to a selection operation on the one or more image processing templates.

For example, the image processing information comprises one or more of the following: scale, size, hue, brightness, contrast, beauty information, filter information and makeup information.

In an embodiment of the present disclosure, each image processing template comprises one or more of image scale, size, hue, brightness, contrast, beauty information, filter information, makeup information and the like corresponding to the each image processing template. the image processing information corresponding to each image processing template may be the same or different, which is not limited in the embodiment.

In an embodiment of the present disclosure, a setting button for the image processing information may be set in the photographing preview area, wherein its corresponding setting buttons are set for the image scale, size, hue, brightness and contrast respectively. Further, in response to a modification operation on the setting button, the image processing information modified may be obtained.

In an embodiment of the present disclosure, if the image processing information comprises filter information, makeup information and beauty information, the filter information, the makeup information and the beauty information are displayed in the photographing preview area.

In an embodiment of the present disclosure, in response to the image processing information comprising the filter information, the makeup information and/or the beauty information, the method further comprises: displaying an image processing information adjustment button in the photographing preview area before performing photographing based on the image processing information; and determining the image processing information adjusted in response to an operation on the image processing information adjustment button.

In the embodiment, the image processing information adjustment button comprises: a filter adjustment button, a makeup adjustment button and a beauty adjustment button.

In an embodiment of the present disclosure, the filter information adjusted is determined in response to a selection operation on the filter adjustment button and then in response to a sliding operation on a information adjustment slider. The makeup information adjusted is determined in response to a selection operation on the makeup adjustment button and then in response to a sliding operation on the information adjustment slider. The beauty information adjusted is determined in response to a selection operation on the beauty adjustment button and then in response to a sliding operation on the information adjustment slider.

Figure 8:
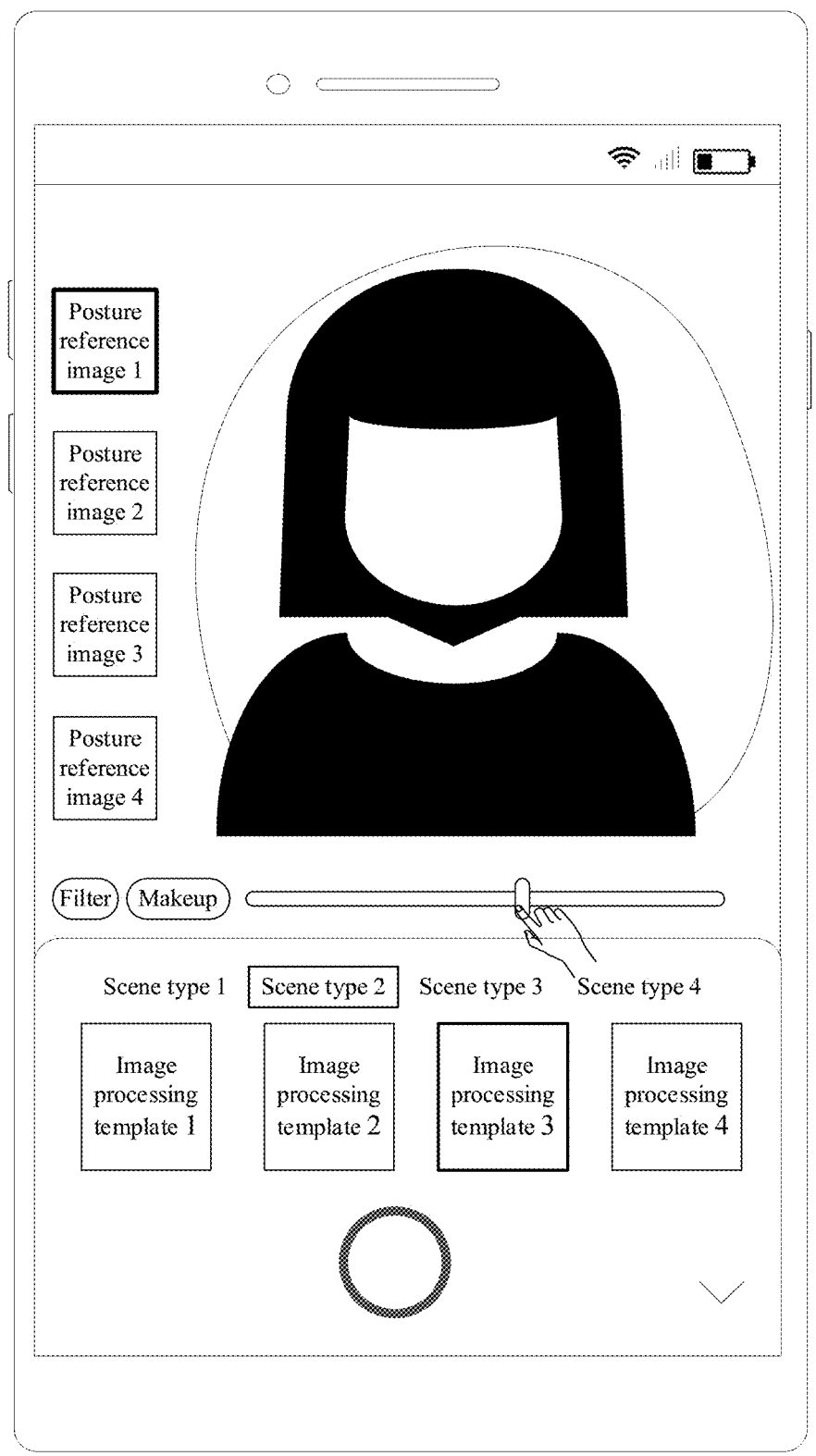
FIG. 8 is a schematic view of an adjustment mode of an image processing parameter in an embodiment of the present disclosure.

For example, as shown in FIG. 8, in response to the selection operation on the filter adjustment button and then in response to the sliding operation on the information adjustment slider by the user, the filter information adjusted is determined based on a sliding ratio. In response to the selection operation on the makeup adjustment button and then in response to the sliding operation on the information adjustment slider by the user, the makeup information adjusted is determined based on a sliding ratio.

In the embodiment, a method of adjusting the image processing information is provided, so that the user may manually adjust the image processing information, and the user may choose a filter or makeup that is more suitable for itself and take more beautiful photos, which improves the photographing experience of the user.

In step S103, one or more material information items corresponding to the image processing template are displayed.

In an embodiment of the present disclosure, the displaying of the one or more material information items corresponding to the image processing template comprises: displaying the one or more material information items corresponding to the image processing template in a photographing preview area. The photographing preview area may be understood as an area in the photographing interface that displays images collected by a camera in real time.

In some embodiments, the material information item comprises one or more of the following: a posture reference image and a sticker information item.

In an embodiment of the present disclosure, in response to the material information item comprising the posture reference image, the displaying of the one or more material information items corresponding to the image processing template comprises: displaying a plurality of posture reference images in a photographing preview area, wherein the posture reference image is configured to prompt a user to imitate a photographing posture corresponding to the posture reference image.

Figure 5:
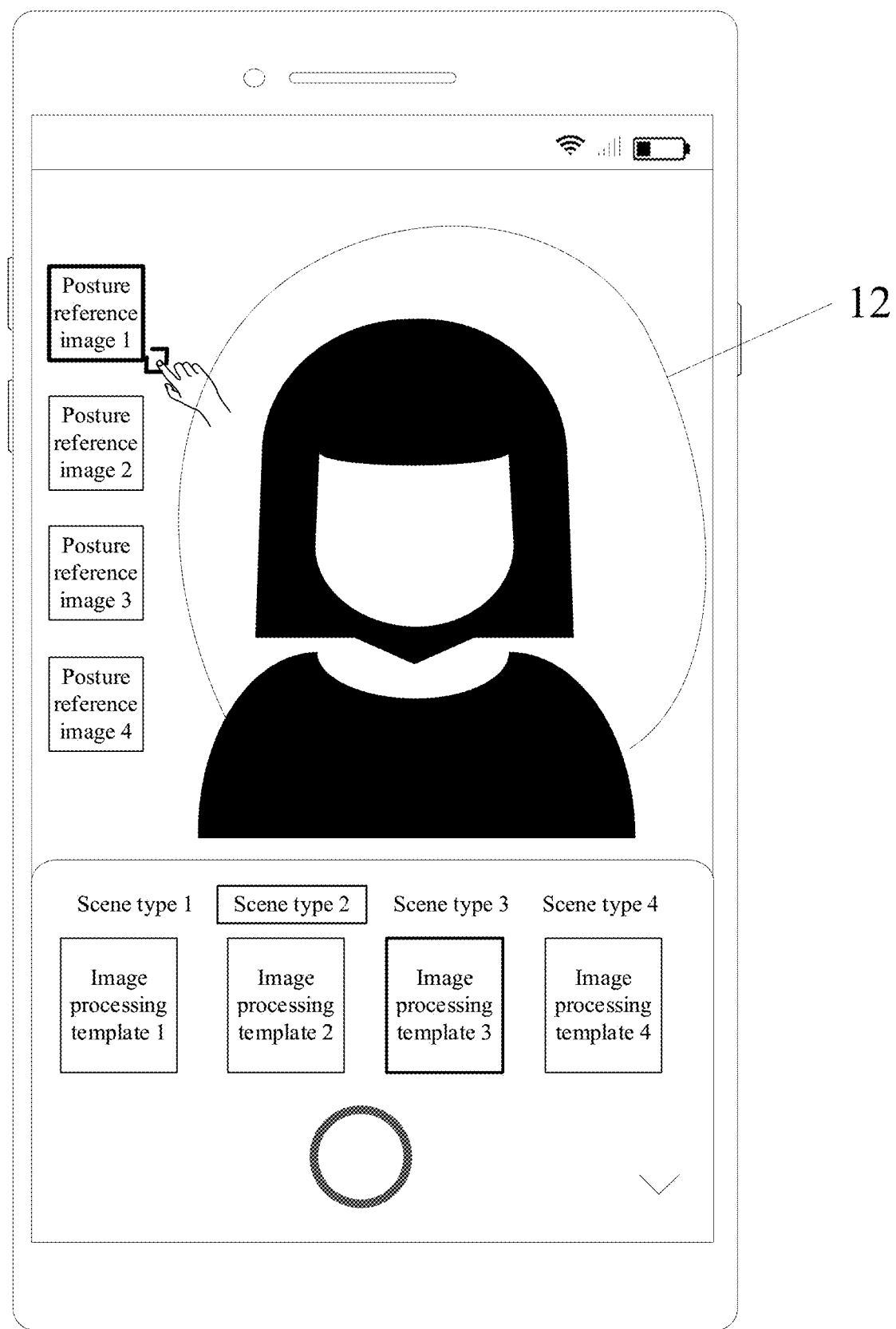
FIG. 5 is a schematic view displaying a posture reference image in an embodiment of the present disclosure.

In the embodiment, each image processing template corresponds to one or more posture reference images, and in response to a selection operation on the image processing template, a posture reference image corresponding to the image processing template selected is obtained, and the posture reference image is displayed in the photographing preview area. As shown in FIG. 5, one image processing template corresponds to four posture reference images which are sequentially displayed in a left area of the photographing preview area in the form of small images.

In an embodiment of the present disclosure, the method further comprises: after displaying the plurality of posture reference images in the photographing preview area, determining a posture contour line corresponding to the posture reference image selected in response to selection of the posture reference image; and displaying the posture reference image selected and the posture contour line in the photographing preview area.

Figure 6:
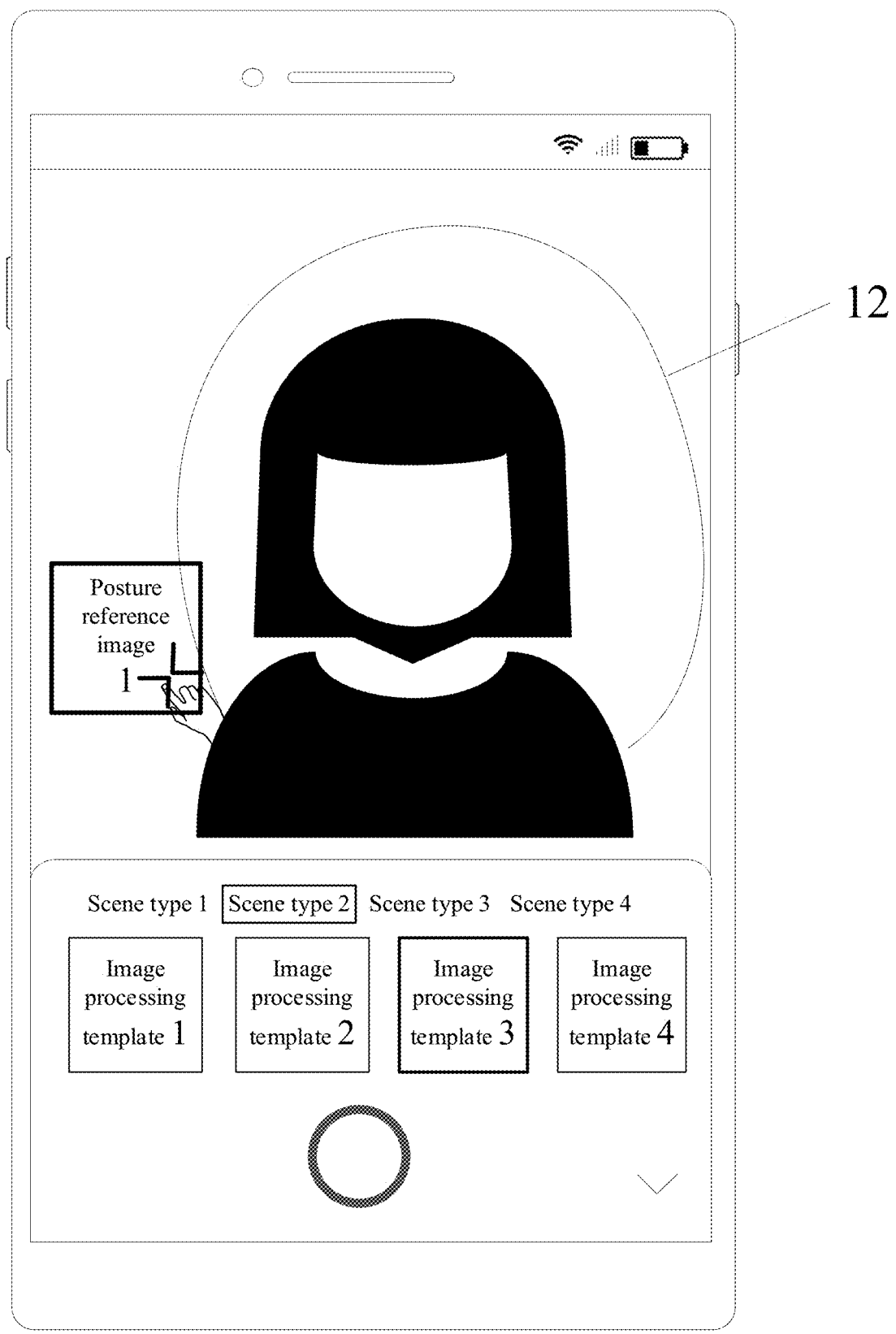
FIG. 6 is a schematic view displaying another posture reference image in the embodiment of the present disclosure.

The posture contour line may be understood as a contour line of a posture delineated based on the posture reference image. As shown in FIG. 5 or 6, a posture contour line 12 corresponding to a posture reference image 1 is displayed in the photographing preview area In the embodiment, it is to be noted that, the posture reference image when not selected is displayed in a first size, and all the posture reference images corresponding to the image processing template are displayed; the posture reference image when selected is displayed in a second size, and only the posture reference image selected is displayed, and other posture reference images corresponding to the image processing template are not displayed. The first size is smaller than the second size.

As shown in FIG. 5, in response to a selection operation on the posture reference image 1, the posture reference image 1 is determined as the posture reference image selected, the posture contour line 12 corresponding to the posture reference image 1 is obtained, and the posture contour line 12 is displayed in the photographing preview area.

In the embodiment, after the user selects the posture reference image, the posture contour line of the posture reference image may be displayed to help the user pose a reference posture more gracefully, so as to obtain a better photographing experience.

Further, as shown in FIG. 8, the posture contour line and the image processing information adjustment button may be displayed concurrently in the photographing preview area.

In some embodiments, the selection of the posture reference image comprises: a triggering operation on an expanding button associated with the posture reference image; or a selection operation on a first posture reference image in response to a triggering operation being not received within a preset time period.

In the embodiment, two methods of selecting a posture reference image are provided.

In an embodiment of the present disclosure, as shown in FIG. 5, an expanding button associated with a posture reference image is set, and in response to a clicking operation on the expanding button, it is determined that a posture reference image is selected.

In an embodiment of the present disclosure, if the user does not perform any operation within a preset time period, the first posture reference image is determined as the posture reference image selected.

In the embodiment, two methods of selecting a posture reference image are provided, which is convenient for user operation.

In an embodiment of the present disclosure, the method further comprises: after displaying the posture reference image selected and the posture contour line in the photographing preview area, displaying the plurality of posture reference images in the photographing preview area in response to a triggering operation on a minimizing button associated with the posture reference image.

In an embodiment of the present disclosure, as shown in FIG. 6, a minimizing button associated with the posture reference image is set, and in response to a clicking operation on the minimizing button, the posture reference image selected displayed in a first size rather than a second size.

For example, in response to a clicking operation on the minimizing button, a plurality of posture reference images are displayed in the photographing preview area, that is, a method of displaying a plurality of sub-views as shown in FIG. 5. Accordingly, the posture reference image selected may be determined again based on the posture reference image displayed.

In the embodiment, a method of minimizing a posture reference image selected and displaying a plurality of posture reference images is provided, which provides the user with multiple reference options and improves the user experience.

In an embodiment of the present disclosure, the plurality of posture reference images are displayed in a sliding form in the photographing preview area in response to a sliding operation on the photographing preview area in a case where number of the plurality of posture reference images is greater than a number threshold.

The number threshold may be determined according to the size of the photographing preview area. For example, the number threshold is 4, that is, if the number of the posture reference images corresponding to the image processing template exceeds 4, a plurality of posture reference images are displayed in a sliding form in the photographing preview area.

Figure 7:
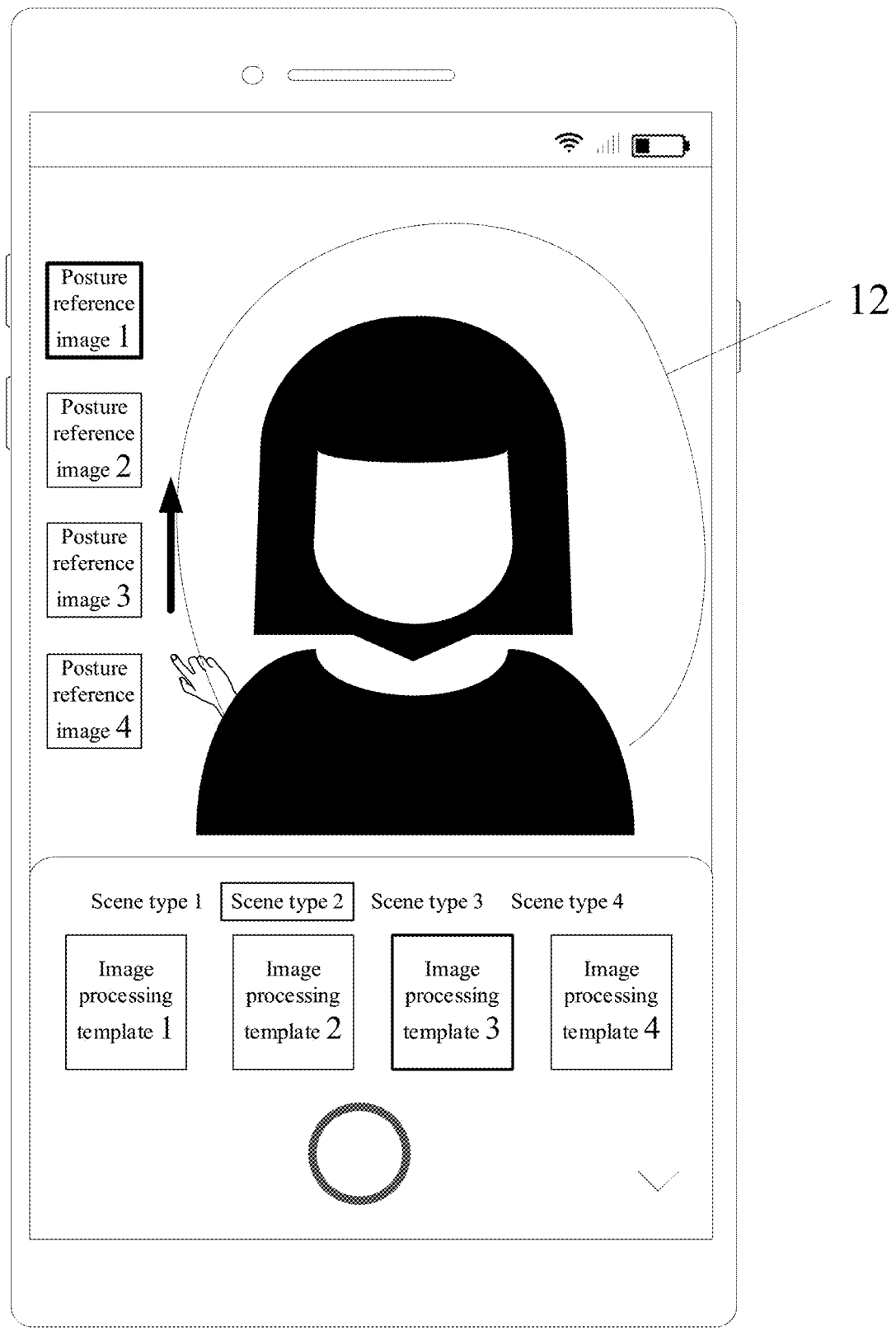
FIG. 7 is a schematic view displaying another posture reference image in an embodiment of the present disclosure.

For example, as shown in FIG. 7, the plurality of posture reference images are displayed in an upward sliding form in the photographing preview area in response to an upward sliding operation on the photographing preview area; or the plurality of posture reference images are displayed in a downward sliding form in the photographing preview area in response to a downward sliding operation on the photographing preview area.

In the embodiment, in the case where the number of the posture reference images is excessive, they are displayed in a sliding form, so as to provide the user with more posture reference images, which is convenient for user selection and improves the user experience.

In Step S104, photographing is performed based on the image processing information in response to a received photographing instruction.

the receiving of the photographing instruction may be detecting a triggering operation on a photographing button by a user, and the photographing button may be a photographing virtual button in a photographing interface or a photographing physical button arranged on a terminal device, which is not specifically limited in the embodiment.

In some embodiments, the image processing information comprises one or more of the following: scale, size, hue, brightness, contrast, beauty information, filter information and makeup information. In the embodiment, the user is photographed by using the above-described image processing information and material information to obtain more beautiful photos.

The embodiment of the present disclosure provides a photographing method, comprising: displaying one or more image processing templates corresponding to a scene type selected in response to selection of the scene type; determining image processing information corresponding to an image processing template selected in response to a selection operation on the one or more image processing templates; displaying one or more material information items corresponding to the image processing template; and performing photographing based on the image processing information in response to a received photographing instruction. The embodiment of the present disclosure optimizes the photographing process by selecting an image processing template and combining the image processing information and the material information item to performing photographing.

In some embodiments, the selection of the scene type comprises: obtaining a preview image collected; identifying the preview image; and determining the selection of the scene type based on an identification result of the preview image.

The preview image collected may be understood as an image currently captured by the camera.

In the embodiment, the preview image is identified by using an image recognition algorithm to determine a scene type in the image. For example, the scene type may be the type of parks, cafes, libraries, shopping malls or the like.

In an embodiment of the present disclosure, after the scene type corresponding to the image is determined, a scene type corresponding to the preview image identified is added in a scene type displaying area as shown in FIG. 2. Moreover, an image processing template corresponding to the scene type corresponding to the preview image is displayed in the image processing template displaying area.

In the embodiment, the terminal device may recommend a corresponding image processing template according to the environment in which the user is located, so that the user may rapidly match an appropriate filter or makeup, which improves the photographing experience of the user.

In some embodiments, the selection of the scene type comprises: obtaining current position information; and determining the selection of the scene type based on the current position information.

In the embodiment, with the permission of the user, a current location of the terminal of the user may be read, and a scene type corresponding to the current location may be determined based on a correspondence relationship between the location and the scene type. For example, when the current location is a cafe, the corresponding scene type is determined to be a visit store checkpoint or a cafe, or even a cafe based on a current POI (Point of Interest). When the current location is a park, it is determined that the corresponding scene type is a holiday travel or a park, or even a park based on a current POI.

In the embodiment, a scene type may be determined according to a geographical location of the terminal, the corresponding image processing template may be recommended, so that the user may rapidly match an appropriate filter or makeup, which improves the photographing experience of the user.

In some embodiment, a function selection panel is displayed in response to an operation on a function panel displaying button in the function selection area. The function panel displaying button is a lower triangle button as described in FIG. 5. The function selection panel is shown in FIG. 3. In the embodiment, it is to be noted that, the function selection panel is displayed in response to the operation on the function panel displaying button in the function selection area. At this time, only the displayed content in the function selection changes, and the displayed content in the photographing preview area will not be changed due to the operation on the function panel displaying button.

In the embodiment, the second function, the third function and the fourth function described in FIG. 3 may be any function in material selection, for example, any of beauty, makeup, filters, postures, stickers, and the like.

It is to be noted that, the second function, the third function and the fourth function are all settings of a single material information item, and there is no correlation between the various material information items.

For example, when the second function is makeup, a plurality of makeup information items is displayed in the function selection area in response to an operation on the second function button, and the makeup information item selected is determined based on a selection operation on the makeup information item. When photographing is performed based on the image processing information, the makeup information item selected is used to replace the makeup information item comprised in the image processing information item for photographing.

For example, when the third function is a filter, plurality of filter information items is displayed in the function selection area in response to an operation on the third function button, and the filter information items selected is determined based on a selection operation on the filter information item. When photographing is performed based on the image processing information item, the filter information item selected is used to replace the filter information item comprised in the image processing information item for photographing.

For another example, when the fourth function is a posture, a plurality of posture types are displayed in the function selection area in response to an operation on the fourth function button, and a plurality of posture reference images corresponding to the posture type selected are determined based on a selection operation on the posture type. One posture reference image is selected from the plurality of posture reference images, and a posture contour line corresponding to the posture reference image is displayed. For the displaying and selection of the posture reference image and the posture contour line, reference may be made to the description in the above-described embodiments, which will not be described in detail in the embodiment.

In the embodiment, the image processing information selected by the user in a single function state replaces the image processing information in the image processing template, so as to implement switching the image processing information, which is convenient for the user to perform different combinations on the image processing information and the material information item and obtain a richer photographing experience.

Figure 9:
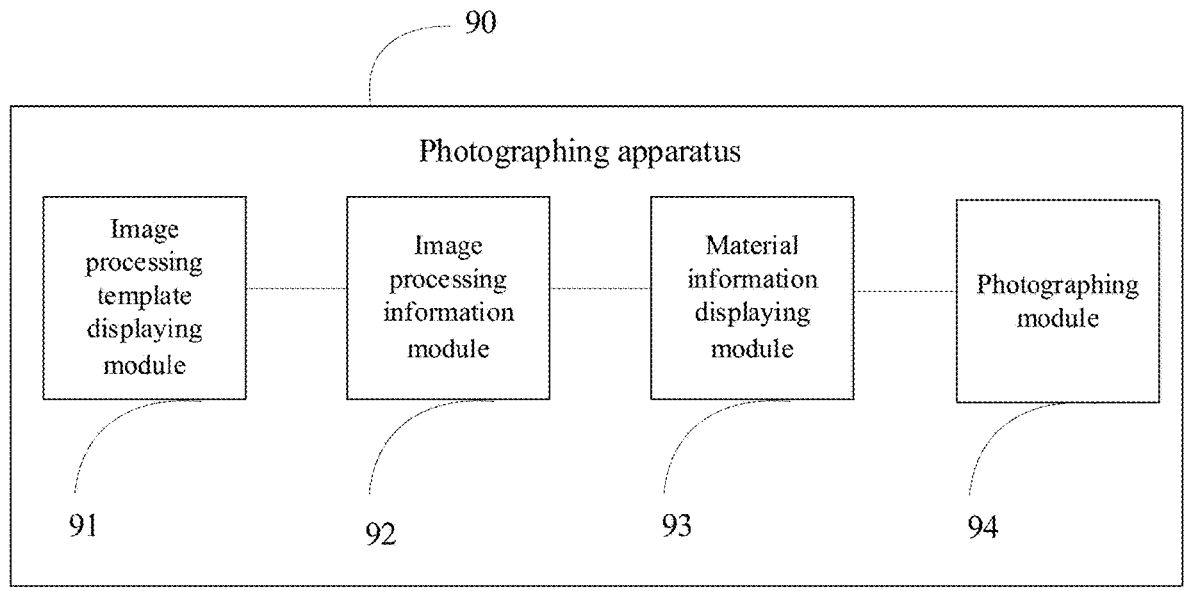
FIG. 9 is a schematic structural view of a photographing apparatus in an embodiment of the present disclosure.

FIG. 9 is a schematic structural view of a photographing apparatus in an embodiment of the present disclosure. The embodiment may be applied to the circumstance of photographing. The photographing apparatus may be implemented by software and/or hardware. The photographing apparatus may be configured in an electronic device. The electronic device comprises a smart terminal with a photographing function, comprising a smart phone, a notebook computer, a tablet computer, a digital camera/camcorder, a game device or the like. In some embodiments, the smart terminal comprises an integrated touch screen.

As shown in FIG. 9, the photographing apparatus 90 provided by the embodiment of the present disclosure mainly comprises: an image processing template displaying module 91, an image processing information module 92, material information a displaying module 93 and a photographing module 94.

The image processing template displaying module 91 is configured to display one or more image processing templates corresponding to a scene type selected in response to selection of the scene type.

The image processing information module 92 is configured to determine image processing information corresponding to an image processing template selected in response to a selection operation on the one or more image processing templates.

The material information displaying module 93 is configured to display one or more material information items corresponding to the image processing template.

The photographing module is configured to perform photographing based on the image processing information in response to a received photographing instruction.

The embodiment of the present disclosure provides a photographing apparatus, for performing the following steps: displaying one or more image processing templates corresponding to a scene type selected in response to selection of the scene type; determining image processing information corresponding to an image processing template selected in response to a selection operation on the one or more image processing templates; displaying one or more material information items corresponding to the image processing template; and performing photographing based on the image processing information in response to a received photographing instruction. The embodiment of the present disclosure optimizes the photographing process by selecting an image processing template and combining the image processing information and the material information item to perform photographing.

In some embodiments, the material information item comprises one or more of the following: a posture reference image and a sticker information item.

In some embodiments, the material information displaying module 93 comprises a posture reference image displaying unit configured to, in response to the material information item comprising the posture reference image, display a plurality of posture reference images in a photographing preview area, wherein the posture reference image is configured to prompt a user to imitate a photographing posture corresponding to the posture reference image.

In some embodiments, the material information displaying module 93 further comprises: a posture contour line determining unit configured to, after displaying the plurality of posture reference images in the photographing preview area, determine a posture contour line corresponding to the posture reference image selected in response to selection of the posture reference image; and a posture contour line displaying unit configured to display the posture reference image selected and the posture contour line in the photographing preview area.

In some embodiments, the posture contour line determining unit is configured to respond to a triggering operation on an expanding button associated with the posture reference image when responding to the selection of the posture reference image; or respond to a selection operation on a first posture reference image in response to a triggering operation being not received within a preset time period.

In some embodiments, the material information displaying module 93 further comprises: a minimizing button triggering unit configured to, after displaying the posture reference image selected and the posture contour line in the photographing preview area, display the plurality of posture reference images in the photographing preview area in response to a triggering operation on a minimizing button associated with the posture reference image.

In some embodiments, the posture reference image displaying unit is configured to display the plurality of posture reference images in a sliding form in the photographing preview area in response to a sliding operation on the photographing preview area in a case where number of the plurality of posture reference images is greater than a number threshold.

In some embodiments, the image processing information comprises one or more of the following: scale, size, hue, brightness, contrast, beauty information, filter information and makeup information.

In some embodiments, the material information displaying module 93 further comprises an image processing information adjustment unit configured to, in response to the image processing information comprising the filter information, the makeup information and/or the beauty information, display an image processing information adjustment button in the photographing preview area before performing photographing based on the image processing information, and determine the image processing information adjusted in response to an operation on the image processing information adjustment button.

In some embodiments, the image processing template displaying module 91 comprises: a position information obtaining unit configured to obtain current position information; and a scene type selection unit configured to determine the selection of the scene type based on the current position information.

In some embodiments, the image processing template displaying module 91 comprises: a preview image collection unit configured to obtain a preview image collected; a preview image identification unit configured to identify the preview image; and a scene type selection unit configured to determine the selection of the scene type based on an identification result of the preview image.

In some embodiments, the photographing apparatus further comprises: a scene type displaying module configured to display one or more scene types in a function selection area in response to a triggering operation on a function button (for example, a first function button) in the function selection area before responding to the selection of the scene type.

In some embodiments, the photographing apparatus further comprises: a function guidance information displaying module configured to display a function guidance information in a function guidance area, wherein the function guidance information comprises a function title, a function content item and a function jump button. The scene type displaying module is configured to display one or more scene types in the function selection area in response to a triggering operation on the function jump button.

In embodiments, the some posture reference image displaying unit is configured to display the plurality of posture reference images in an upward sliding form in the photographing preview area in response to an upward sliding operation on the photographing preview area, or display the plurality of posture reference images in a downward sliding form in the photographing preview area in response to a downward sliding operation on the photographing preview area.

The photographing apparatus provided by the embodiment of the present disclosure may perform the steps performed in the photographing method provided by the method embodiment of the present disclosure, and the performing steps and beneficial effects will not be described in detail here.

Figure 10:
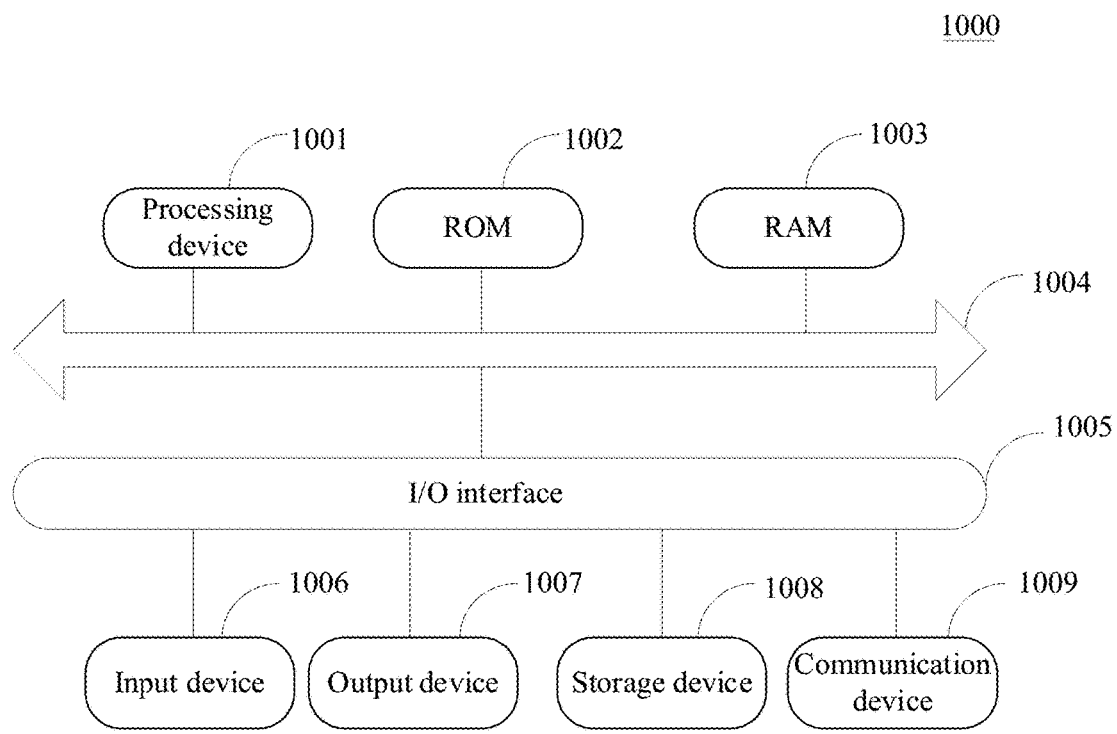
FIG. 10 is a schematic structural view of an electronic device in an embodiment of the present disclosure.

FIG. 10 is a schematic structural view of an electronic device in an embodiment of the present disclosure. Next, specifically refer to FIG. 10, which displays a schematic structural view of an electronic device 1000 suitable for implementing the embodiment of the present disclosure. The electronic device 1000 in the embodiment of the present disclosure may comprise, but is not limited to, a mobile terminal such as a mobile phone, a notebook computer, a digital broadcast receiver, a PDA (personal digital assistant), a PAD (tablet computer), a PMP (Portable Multimedia Player), an in-vehicle terminal (for example, an in-vehicle navigation terminal) and a wearable terminal device; and a fixed terminal such as a digital TV, a desktop computer and a smart home device. The electronic device shown in FIG. 10 which is only an example, shall not limit the functions and application range of the embodiments of the present disclosure.

As shown in FIG. 10, the electronic device 1000 may comprise a processing device (for example, a central processing unit, a graphic processor, or the like) 1001, which may perform various suitable actions and processing according to a program stored in a Read only Memory (ROM) 1002 or a program loaded from a storage device 1008 into a Random Access Memory (RAM) 1003 to implement the photographing method in an embodiment according to the present disclosure. In the RAM 1003, various programs and data required for the operation of the terminal device 1000 are also stored. The processing device 1001, the ROM 1002 and the RAM 1003 are connected to each other through a bus 1004. The input/output (I/O) interface 1005 is also connected to the bus 1004.

Generally, the following devices may be connected to the I/O interface 1005: an input device 1006 comprising, for example, a touch screen, a touch pad, a keyboard, a mouse, a camera, a microphone, an accelerometer, a gyroscope, or the like; an output device 1007 comprising, for example, a Liquid Crystal Display (LCD), a speaker, a vibrator, or the like; a storage device 1008 comprising, for example, a magnetic tape, a hard disk, or the like; and a communication device 1009. The communication device 1009 may allow the terminal device 1000 to be in wireless or wired communication with other devices to exchange data. Although FIG. 10 displays the terminal device 1000 with various devices, it should be understood that there is no requirement to implement or have all the devices shown. It is possible to alternatively implement or possess more or less devices.

In particular, according to an embodiment of the present disclosure, the process described above with reference to the flowchart may be implemented as a computer software program. For example, in an embodiment of the present disclosure, there comprises a computer program product, which comprises a computer program carried on a non-transient computer-readable medium, wherein the computer program contains program codes for performing the method displayed in the flowchart so as to implement the photographing method described above. In such embodiment, the computer program may be downloaded and installed from the network through the communication device 1009, installed from the storage device 1008, or installed from the ROM 1002. When the computer program is executed by the processing device 1001, the above-described functions defined in the method of the embodiment of the present disclosure are performed.

It is to be noted that, the above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. For example, the computer readable storage medium is a non-transitory computer readable storage medium. More specific examples of the computer-readable storage medium may comprise, but is not limited to: an electrical connection having one or more wires, a portable computer disk, a hard disk, a random access memory (RAM), a read only memory (ROM), an erasable programmable read only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium. The computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), or the like, or any suitable combination thereof.

In some embodiments, the client and the server may communicate using any currently known or future developed network protocol such as HTTP (HyperText Transfer Protocol), and may be interconnected with digital data communication in any form or medium (for example, communication network). Examples of communication networks comprise a Local Area Network ("LAN"), a Wide Area Network ("WAN"), an extranet (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs that, when executed by the terminal device, cause the terminal device to: display one or more image processing templates corresponding to a scene type selected in response to selection of the scene type; determine image processing information corresponding to an image processing template selected in response to a selection operation on the one or more image processing templates; display one or more material information items corresponding to the image processing template; and perform photographing based on the image processing information in response to a received photographing instruction.

In some embodiments, when the above-described one or more programs are executed by the terminal device, the terminal device may also perform other steps according to the above-described embodiments.

The computer program code for performing the operations of the present disclosure may be written in one or more programming languages or a combination thereof. The above-described programming languages comprise, but are not limited to, object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks displayed in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The units involved in the described embodiments of the present disclosure may be implemented in software or hardware. The names of the units do not constitute a limitation on the units themselves under certain circumstances.

The functions described hereinabove may be performed at least in part by one or more hardware logic components. For example, without limitation, the hardware logic components of a demonstrative type that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) or the like.

In the context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, device or device, or any suitable combination thereof. More specific examples of the machine-readable storage medium may comprise an electrical connection based on one or more wires, a portable computer disk, a hard disk, a random access memory (RAM), a read only memory (ROM), an erasable programmable read-only memory (EPROM or flash memory), an optical fiber, a portable compact disk read only memory (CD-ROM), an optical storage device, a magnetic storage device, or any suitable combination thereof.

According to one or more embodiments of the present disclosure, the present disclosure provides a photographing method, comprising: displaying one or more image processing templates corresponding to a scene type selected in response to selection of the scene type; determining image processing information corresponding to an image processing template selected in response to a selection operation on the one or more image processing templates; displaying one or more material information items corresponding to the image processing template; and performing photographing based on the image processing information in response to a received photographing instruction.

According to one or more embodiments of the present disclosure, the present disclosure provides a photographing method, wherein a material information item in the one or more material information items comprises one or more of a posture reference image and a sticker information item.

According to one or more embodiments of the present disclosure, the present disclosure provides a photographing method, wherein in response to the material information item comprising the posture reference image, the displaying of the one or more material information items corresponding to the image processing template comprises: displaying a plurality of posture reference images in a photographing preview area, wherein the posture reference image is configured to prompt a user to imitate a photographing posture corresponding to the posture reference image.

According to one or more embodiments of the present disclosure, the present disclosure provides a photographing method, wherein the photographing method further comprises: after displaying the plurality of posture reference images in the photographing preview area, determining a posture contour line corresponding to the posture reference image selected in response to selection of the posture reference image; and displaying the posture reference image selected and the posture contour line in the photographing preview area.

According to one or more embodiments of the present disclosure, the present disclosure provides a photographing method, wherein the selection of the posture reference image comprises: a triggering operation on an expanding button associated with the posture reference image; or a selection operation on a first posture reference image in response to a triggering operation being not received within a preset time period.

According to one or more embodiments of the present disclosure, the present disclosure provides a photographing method, wherein the photographing method further comprises: after displaying the posture reference image selected and the posture contour line in the photographing preview area, displaying the plurality of posture reference images in the photographing preview area in response to a triggering operation on a minimizing button associated with the posture reference image.

According to one or more embodiments of the present disclosure, the present disclosure provides a photographing method, wherein the plurality of posture reference images are displayed in a sliding form in the photographing preview area in response to a sliding operation on the photographing preview area in a case where number of the plurality of posture reference images is greater than a number threshold.

According to one or more embodiments of the present disclosure, the present disclosure provides a photographing method, wherein the image processing information comprises one or more of scale, size, hue, brightness, contrast, beauty information, filter information and makeup information.

According to one or more embodiments of the present disclosure, in response to the image processing information comprising the filter information, the makeup information and/or the beauty information, the photographing method further comprises: displaying an image processing information adjustment button in the photographing preview area before performing photographing based on the image processing information; and determining the image processing information adjusted in response to an operation on the image processing information adjustment button.

According to one or more embodiments of the present disclosure, the present disclosure provides a photographing method, wherein the selection of the scene type comprises: obtaining current position information; and determining the selection of the scene type based on the current position information.

According to one or more embodiments of the present disclosure, the present disclosure provides a photographing method, wherein the selection of the scene type comprises: obtaining a preview image collected; identifying the preview image; and determining the selection of the scene type based on an identification result of the preview image.

According to one or more embodiments of the present disclosure, the present disclosure provides a photographing method, wherein the photographing method further comprises: displaying one or more scene types in a function selection area in response to a triggering operation on a function button in the function selection area before responding to the selection of the scene type.

According to one or more embodiments of the present disclosure, the present disclosure provides a photographing method, wherein the photographing method further comprises: displaying a function guidance information in a function guidance area, wherein the function guidance information comprises a function title, a function content item and a function jump button; and displaying one or more scene types in the function selection area in response to a triggering operation on the function jump button.

According to one or more embodiments of the present disclosure, the present disclosure provides a photographing method, wherein displaying the plurality of posture reference images in the sliding form in the photographing preview area in response to the sliding operation on the photographing preview area comprises: displaying the plurality of posture reference images in an upward sliding form in the photographing preview area in response to an upward sliding operation on the photographing preview area; or displaying the plurality of posture reference images in a downward sliding form in the photographing preview area in response to a downward sliding operation on the photographing preview area.

According to one or more embodiments of the present disclosure, the present disclosure provides a photographing apparatus, comprising: an image processing template displaying module configured to display one or more image processing templates corresponding to a scene type selected in response to selection of the scene type; an image processing information module configured to determine image processing information corresponding to an image processing template selected in response to a selection operation on the one or more image processing templates; a material information displaying module configured to display one or more material information items corresponding to the image processing template; and a photographing module configured to perform photographing based on the image processing information in response to a received photographing instruction.

According to one or more embodiments of the present disclosure, the present disclosure provides a photographing apparatus, wherein the material information item comprises one or more of a posture reference image and a sticker information item.

According to one or more embodiments of the present disclosure, the present disclosure provides photographing apparatus, wherein the material information displaying module comprises a posture reference image displaying unit configured to, in response to the material information item comprising the posture reference image, display a plurality of posture reference images in a photographing preview area, wherein the posture reference image is configured to prompt a user to imitate a photographing posture corresponding to the posture reference image.

According to one or more embodiments of the present disclosure, the present disclosure provides a photographing apparatus, wherein the material information displaying module further comprises: a posture contour line determining unit configured to, after displaying the plurality of posture reference images in the photographing preview area, determine a posture contour line corresponding to the posture reference image selected in response to selection of the posture reference image; and a posture contour line displaying unit configured to display the posture reference image selected and the posture contour line in the photographing preview area.

According to one or more embodiments of the present disclosure, the present disclosure provides a photographing apparatus, wherein the posture contour line determining unit is configured to respond to a triggering operation on an expanding button associated with the posture reference image when responding to the selection of the posture reference image; or respond to a selection operation on a first posture reference image in response to a triggering operation being not received within a preset time period.

According to one or more embodiments of the present disclosure, the present disclosure provides a photographing apparatus, wherein the material information displaying module further comprises: a minimizing button triggering unit configured to, after displaying the posture reference image selected and the posture contour line in the photographing preview area, display the plurality of posture reference images in the photographing preview area in response to a triggering operation on a minimizing button associated with the posture reference image.

According to one or more embodiments of the present disclosure, the present disclosure provides a photographing apparatus, wherein the posture reference image displaying unit is configured to display the plurality of posture reference images in a sliding form in the photographing preview area in response to a sliding operation on the photographing preview area in a case where number of the plurality of posture reference images is greater than a number threshold.

According to one or more embodiments of the present disclosure, the image processing information comprises one or more of scale, size, hue, brightness, contrast, beauty information, filter information and makeup information.

According to one or more embodiments of the present disclosure, the present disclosure provides a photographing apparatus, wherein the material information displaying module further comprises an image processing information adjustment unit configured to, in response to the image processing information comprising the filter information, the makeup information and/or the beauty information, display an image processing information adjustment button in the photographing preview area before performing photographing based on the image processing information, and determine the image processing information adjusted in response to an operation on the image processing information adjustment button.

According to one or more embodiments of the present disclosure, the present disclosure provides a photographing apparatus, wherein the image processing template displaying module comprises: a position information obtaining unit configured to obtain current position information of a user; and a scene type selection unit configured to determine the selection of the scene type based on the current position information.

According to one or more embodiments of the present disclosure, the present disclosure provides a photographing apparatus, wherein the image processing template displaying module comprises: a preview image collection unit configured to obtain a preview image collected; a preview image identification unit configured to identify the preview image; and a scene type selection unit configured to determine the selection of the scene type based on an identification result of the preview image.

According to one or more embodiments of the present disclosure, the present disclosure provides a photographing apparatus, wherein the photographing apparatus further comprises: a scene type displaying module configured to display one or more scene types in a function selection area in response to a triggering operation on a first function button in the function selection area before responding to the selection of the scene type.

According to one or more embodiments of the present disclosure, the present disclosure provides a photographing apparatus, wherein the photographing apparatus further comprises: a function guidance information displaying module configured to display a function guidance information in a function guidance area, wherein the function guidance information comprises a function title, a function content item and a function jump button. The scene type displaying module is configured to display one or more scene types in the function selection area in response to a triggering operation on the function jump button.

According to one or more embodiments of the present disclosure, the present disclosure provides a photographing apparatus, wherein the posture reference image displaying unit is configured to display the plurality of posture reference images in an upward sliding form in the photographing preview area in response to an upward sliding operation on the photographing preview area, or display the plurality of posture reference images in a downward sliding form in the photographing preview area in response to a downward sliding operation on the photographing preview area.

According to one or more embodiments of the present disclosure, the present disclosure provides an electronic device, comprising: one or more processors; and a memory configured to store one or more programs; wherein the one or more programs, when executed by the one or more processors, cause the one or more processors to implement the photographing method according to any one provided by the present disclosure.

According to one or more embodiments of the present disclosure, the present disclosure provides a computer-readable storage medium having a computer program stored thereon that, when executed by a processor, implements the photographing method according to any one provided by the present disclosure.

The embodiment of the present disclosure also provides a computer program product, comprising: computer programs or instructions that, when executed by a processor, implement the photographing method according to any one provided by the present disclosure.

The embodiment of the present disclosure also provides a computer program, which comprises instructions which, when executed by a processor, cause the processor to perform the photographing method as described above.

The above description is only an explanation of preferred embodiments of the present disclosure and the applied technical principles. Those skilled in the art should understand that the scope of disclosure involved in the present disclosure is not limited to the technical solutions formed by the specific combination of the above technical features, and at the same time should also cover other technical solutions formed by arbitrarily combining the above-described technical features or equivalent features without departing from the above disclosed concept. For example, the above-described features and the technical features disclosed in the present disclosure (but not limited thereto) having similar functions are replaced with each other to form a technical solution.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above discussion, these should not be construed as limiting the scope of the present disclosure. Certain features that are described in the context of individual embodiments may also be implemented in combination in a single embodiment. On the contrary, various features described in the context of a single embodiment may also be implemented in multiple embodiments individually or in any suitable sub-combination.

Although the present subject matter has been described in language specific to structural features and/or methodological actions, it should be understood that the subject matter defined in the appended claims is not necessarily limited to the specific features or actions described above. On the contrary, the specific features and actions described above are only exemplary forms of implementing the claims.

What is claimed is:

1. A photographing method, comprising:
  displaying one or more image processing templates corresponding to a scene type selected in response to selection of the scene type;
  determining image processing information corresponding to an image processing template selected in response to a selection operation on the one or more image processing templates;

displaying one or more material information items corresponding to the image processing template; and performing photographing based on the image processing information in response to a received photographing instruction, wherein in response to a material information item in the one or more material information items comprising a posture reference image, the displaying of the one or more material information items corresponding to the image processing template comprises: displaying a plurality of posture reference images in a photographing preview area, wherein the posture reference image is configured to prompt a user to imitate a photographing posture corresponding to the posture reference image; and wherein the displaying of the plurality of posture reference images in the photographing preview area comprises:

displaying the plurality of posture reference images in a sliding form in the photographing preview area in response to a sliding operation on the photographing preview area in a case where a number of the plurality of posture reference images is greater than a number threshold.

2. The photographing method according to claim 1, further comprising:

after displaying the plurality of posture reference images in the photographing preview area, determining a posture contour line corresponding to the posture reference image selected in response to selection of the posture reference image; and displaying the posture reference image selected and the posture contour line in the photographing preview area.

3. The photographing method according to claim 2, wherein the selection of the posture reference image comprises:

a triggering operation on an expanding button associated with the posture reference image; or a selection operation on a first posture reference image in response to a triggering operation being not received within a preset time period.

4. The photographing method according to claim 2, further comprising:

after displaying the posture reference image selected and the posture contour line in the photographing preview area, displaying the plurality of posture reference images in the photographing preview area in response to a triggering operation on a minimizing button associated with the posture reference image.

5. The photographing method according to claim 1, wherein the image processing information comprises one or more of scale, size, hue, brightness, contrast, beauty information, filter information and makeup information.

6. The photographing method according to claim 5, wherein in response to the image processing information comprising the filter information, the makeup information and/or the beauty information, the photographing method further comprises:

displaying an image processing information adjustment button in the photographing preview area before performing photographing based on the image processing information; and determining the image processing information adjusted in response to an operation on the image processing information adjustment button.

7. The photographing method according to claim 1, wherein the selection of the scene type comprises:

obtaining current position information; and determining the selection of the scene type based on the current position information.

8. The photographing method according to claim 1, wherein the selection of the scene type comprises:

obtaining a preview image collected;

identifying the preview image; and determining the selection of the scene type based on an identification result of the preview image.

9. The photographing method according to claim 1, further comprising:

displaying one or more scene types in a function selection area in response to a triggering operation on a function button in the function selection area before responding to the selection of the scene type.

10. The photographing method according to claim 1, further comprising:

displaying a function guidance information in a function guidance area, wherein the function guidance information comprises a function title, a function content item and a function jump button; and displaying one or more scene types in a function selection area in response to a triggering operation on the function jump button.

11. The photographing method according to claim 1, wherein displaying the plurality of posture reference images in the sliding form in the photographing preview area in response to the sliding operation on the photographing preview area comprises:

displaying the plurality of posture reference images in an upward sliding form in the photographing preview area in response to an upward sliding operation on the photographing preview area; or displaying the plurality of posture reference images in a downward sliding form in the photographing preview area in response to a downward sliding operation on the photographing preview area.

12. An electronic device, comprising:

one or more processors; and a memory configured to store one or more programs;

wherein the one or more programs, when executed by the one or more processors, cause the one or more processors to:

display one or more image processing templates corresponding to a scene type selected in response to selection of the scene type;

determine image processing information corresponding to an image processing template selected in response to a selection operation on the one or more image processing templates;

display one or more material information items corresponding to the image processing template; and perform photographing based on the image processing information in response to a received photographing instruction, wherein a material information item in the one or more material information items comprises a posture reference image; and the one or more programs, when executed by the one or more processors, cause the one or more processors to display a plurality of posture reference images in a photographing preview area, wherein the posture reference image is configured to prompt a user to imitate a photographing posture corresponding to the posture reference image; and wherein the one or more programs, when executed by the one or more processors, cause the one or more processors to display the plurality of posture reference images in a sliding form in the photographing preview area in response to a sliding operation on the photographing preview area in a case where a number of the plurality of posture reference images is greater than a number threshold.

13. A non-transitory computer-readable storage medium having a computer program stored thereon that, when executed by a processor, causes the processor to:
   display one or more image processing templates corresponding to a scene type selected in response to selection of the scene type;
   determine image processing information corresponding to an image processing template selected in response to a selection operation on the one or more image processing templates;
   display one or more material information items corresponding to the image processing template; and
   perform photographing based on the image processing information in response to a received photographing instruction,
wherein a material information item in the one or more material information items comprises a posture reference image; and the computer program, when executed by the processor, causes the processor to display a plurality of posture reference images in a photographing preview area, wherein the posture reference image is configured to prompt a user to imitate a photographing posture corresponding to the posture reference image; and
wherein the computer program, when executed by the processor, causes the processor to display the plurality of posture reference images in a sliding form in the photographing preview area in response to a sliding operation on the photographing preview area in a case where a number of the plurality of posture reference images is greater than a number threshold.

\* \* \* \* \*